United States Patent [19]

Herrbach

[11] Patent Number: 5,157,998

[45] Date of Patent: Oct. 27, 1992

[54] ATTACHMENT ASSEMBLY FOR MULTI-SPINDLE MACHINE TOOL

[76] Inventor: Eugene E. Herrbach, 10720 Westfield Blvd., Indianapolis, Ind. 46280

[21] Appl. No.: 827,476

[22] Filed: Jan. 29, 1992

Related U.S. Application Data

[63] Continuation of Ser. No. 518,451, May 4, 1990, abandoned.

[51] Int. Cl.⁵ .............................................. B23B 3/36
[52] U.S. Cl. ...................................... 82/152; 82/118; 82/124; 82/129
[58] Field of Search ................. 82/152, 153, 154, 155, 82/156, 118, 129, 124

[56] References Cited

U.S. PATENT DOCUMENTS 3,683,724  8/1972  Crane .................................. 82/124
3,927,583 11/1975  Parsons et al. ...................... 82/124
4,771,662  9/1988  Eichenhofer et al. ............... 82/129

Primary Examiner—Bruce M. Kisliuk
Assistant Examiner—Lawrence Cruz

[57] ABSTRACT

An attachment assembly for a multi-spindle screw machines which provides positive part recovery and increased back-machining capabilities. The attachment is fully integrated in the host multi-spindle machine to complete cut-off, back-machining operations, and part recovery within the cycle time of the host machine. The configuration and construction of the attachment assembly provides reliable operation with minimum adjustment and simplified trouble-shooting through a central processing display panel. The integration of the components also simplifies tool changes and adjustments for production of different parts. As a result, the cut-off and back-machining are accomplished within the limited cycle time of the multi-spindle machine while recovery of the finished part ensures diversion to the proper storage bin prior to return to the start position to pick-off the next production part.

18 Claims, 6 Drawing Sheets

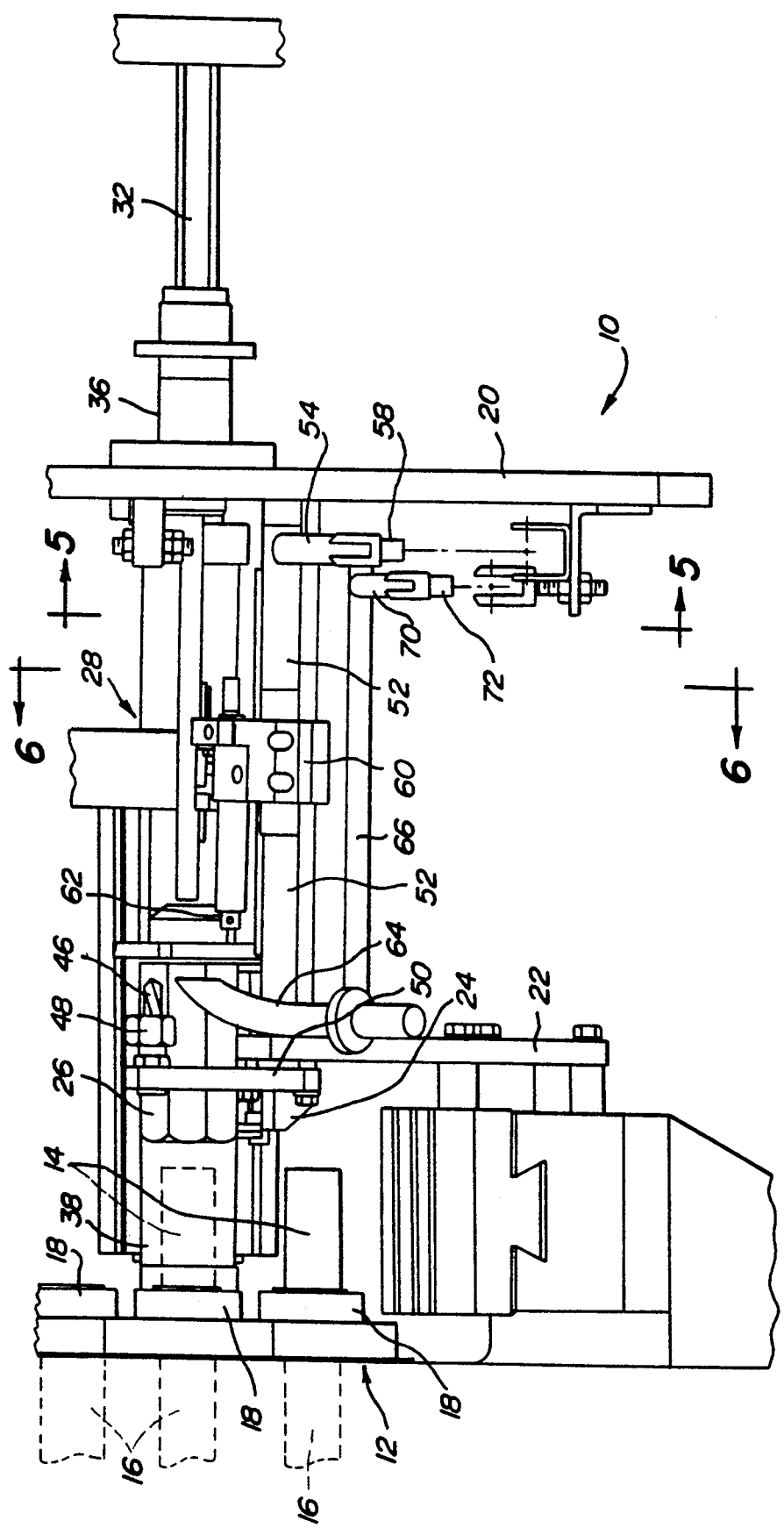

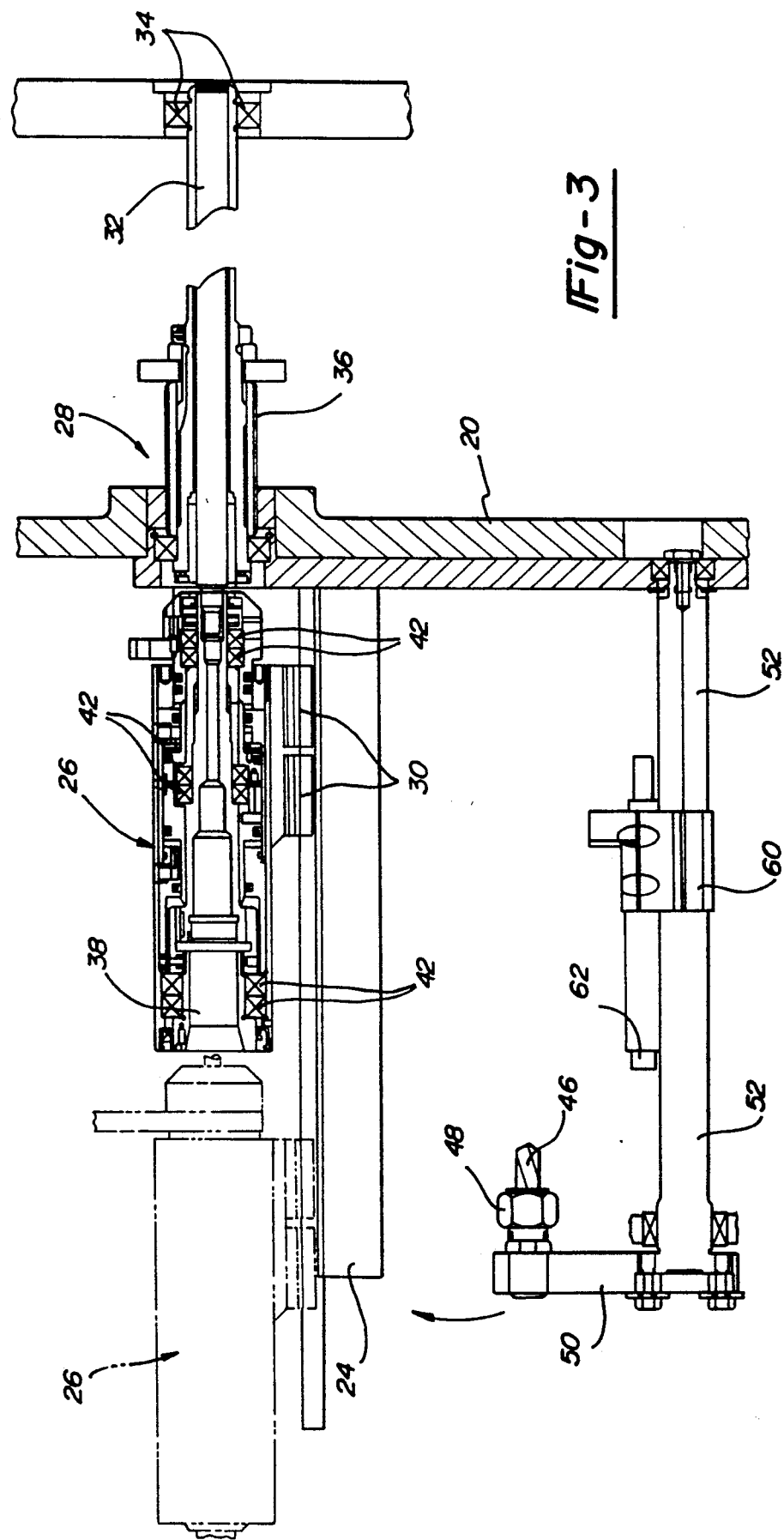

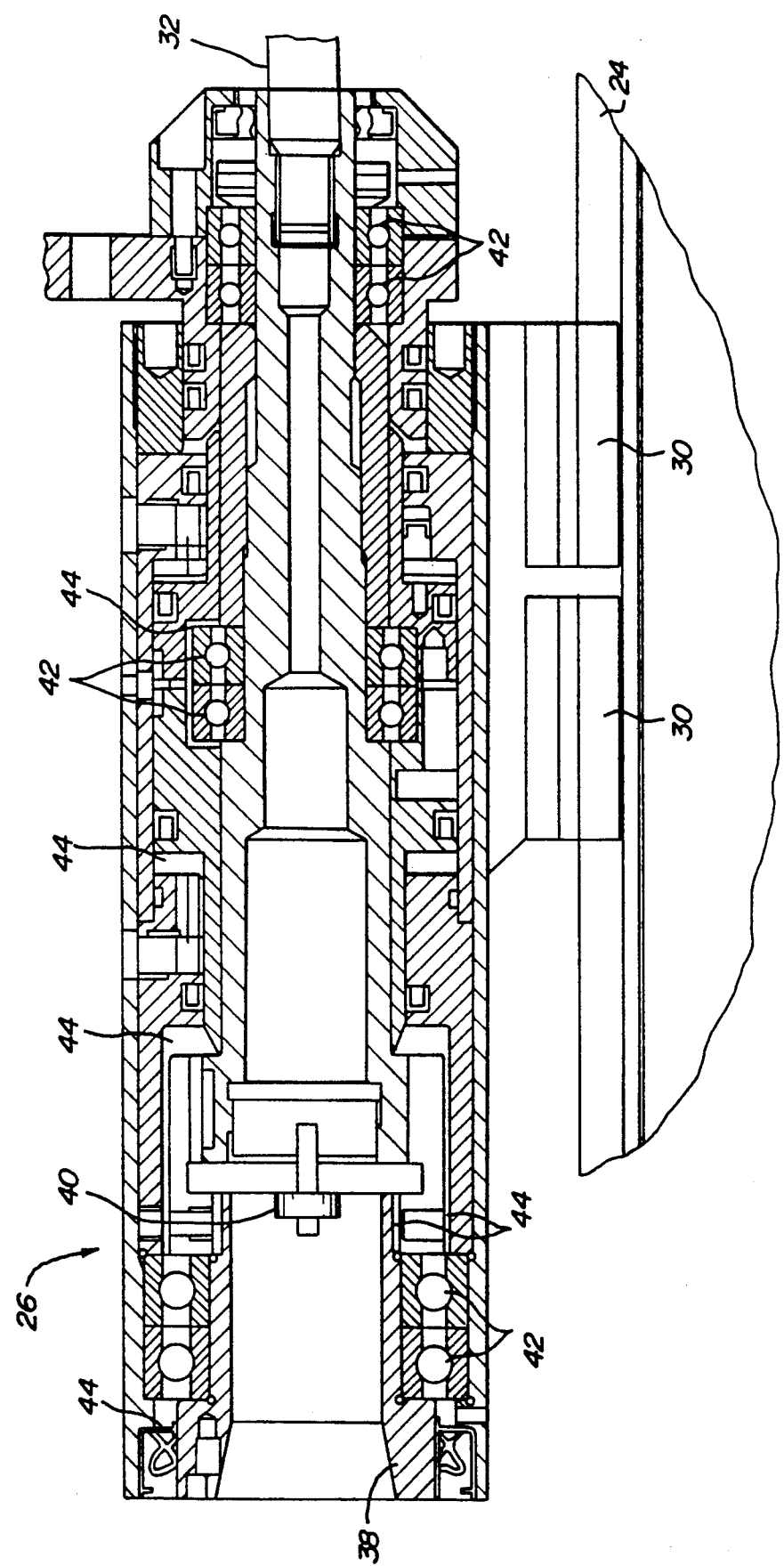

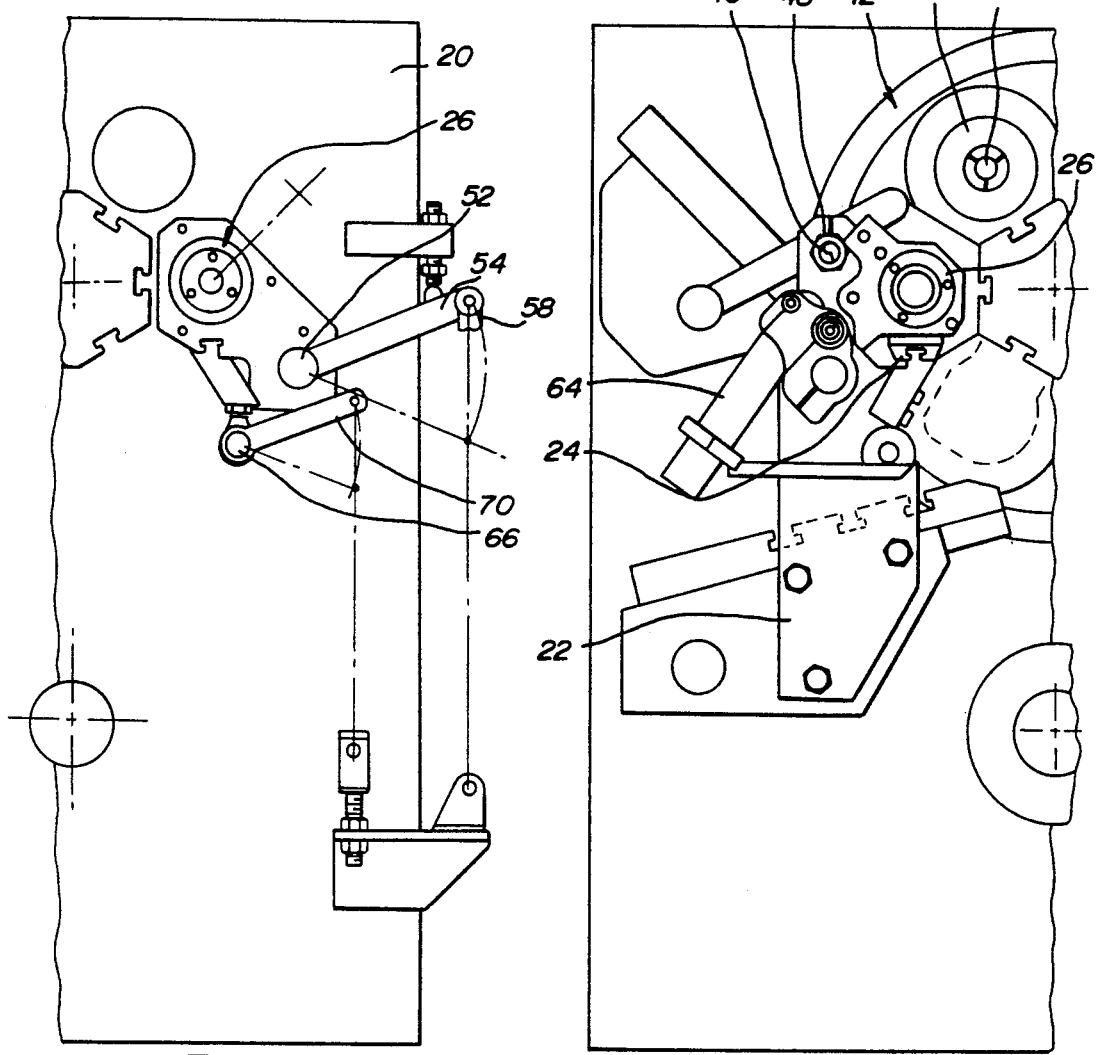
Fig-5
Fig-6
Fig-8A
Fig-8D
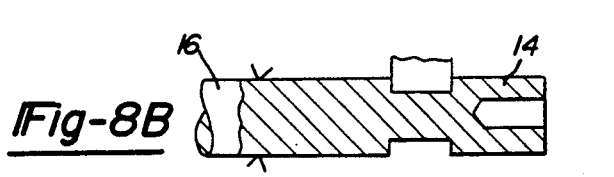
Fig-8B
Fig-8E
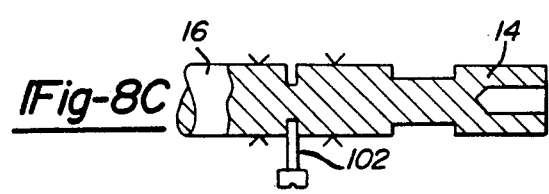
Fig-8C

ATTACHMENT ASSEMBLY FOR MULTI-SPINDLE MACHINE TOOL

This is a continuation of application(s) Ser. No. 07/518,451 filed on May 4, 1990, now abandoned.

BACKGROUND OF THE INVENTION

I. Field of the Invention

The present invention relates to pick-off attachments for multi-spindle machine tools and, in particular, to a pneumatic pick-off attachment for multi-spindle screw machines which provides positive part recovery and increased back-machining capabilities.

II. Description of the Prior Art

Multi-spindle automatic screw machines are widely used in industry for mass producing similar components. Typically, such machines utilize six to sixteen spindles or stations at which the part is subjected to a different machining operation. The stock rotates through each of the stations until completed at which point the part is cut from the bar stock. The individual operations are timed so as to be nearly equal in duration with maintenance of the stock at each station dependent upon the slowest operation having the longest cycle time. As part of the final operation the machined part is cut off from the bar stock fed through the multi-spindle machine. In the past, if additional back-machining of the opposite end of the part is required these operations were conducted on secondary, many times manual, equipment.

Pick-up and back burr attachments have been developed which retrieve the cut-off part and conduct the secondary back machining operations. These attachments employ cam actuated movements which are transferred by linkages requiring numerous settings and adjustments not only during initial set-up but also throughout the run of parts. In the typical prior known cam actuated attachments, adjustments are required for collet tensioning, collet closing, rod stops, ejection rod, quadrant setting, pusher rod clamps, bar stop lever, back-machining cutting tool and back-machining dead stop. In the event even one of these settings is misadjusted it can take an operator several attempts to locate the cause of the misadjustment. Furthermore, the multiple components found in such prior known assemblies depend upon precise setting and synchronous operation. Upon adjusting one setting additional settings may become misadjusted. Often out-of-tune conditions result in lost production parts, broken cut-off tools, broken shear pins and damaged linkage. The cam-operated attachments also may utilize conventional "T" slides and unsealed bearings which are subject to chip contamination and wear. Additionally, limited closing and opening range of the part retrieval collet requires consistency in the outer diameter of the parts. If the parts are oversized, the collet clamping causes the cooperating linkage to become misaligned.

In addition to the alignments and adjustments required for typical attachments, the prior known attachments have limited back-machining capability. In some prior attachments, the bar stop arm is used to retain the back-machining tool. Constant ramming of the bar as it is fed causes the bar stop arm to flex changing the finish depth and center. Furthermore, the limited available machining revolutions due to timing limits the machining depth or overall back machining functions which can be accomplished in the given cycle time. In the past, these limitations were simply accepted as part of cam actuated multi-spindle machines. Any significant back-machining was done as a separate operation typically at a different part of the plant.

SUMMARY OF THE PRESENT INVENTION

The present invention overcomes the disadvantages of the prior known multi-spindle attachments by providing an integrated back-machining system which is fully adaptable to existing multi-spindle equipment and provide additional cutting revolutions for the back-machining within the existing cycle time.

The present invention provides an integrated back-machining and positive part recovery system for use with multi-spindle machines. The invention provides a number of advantages and features which facilitate an extended back-machining range within the existing cycle time of the host machine while also ensuring reliable operation. The system includes an axially slidable head unit which incorporates a collet to retain and retract the machined part. The head unit is longitudinally slidable along an independent ball rail to retract the cut-off part from the multi-spindle unit. The rail has a double-sealed linear bearing system to reduce wear while maintaining accurate movement for more accurate back-machining. The collet is positioned within the completely sealed head unit and an integrated collet ejector pin thereby aids in preventing debris from entering the head unit. The collet is replaceable for different part configurations and rotates within the head unit for the cut-off and back-machining operations. The head unit retains the part during cut-off and back-machining and slides longitudinally to complete the desired operations. Micrometers incorporated into the assembly limit the movement of the head unit according to the operation.

The integrated system of the present invention is controlled and monitored through a micro PC interfaced with the existing host machine controls. The control system allows the operations to be tailored according to the production parts. Indicator lights allow easy trouble shooting and adjustment. As the part of the multi-spindle machine moves into the final station for machining and/or cut-off, the head unit advances to accept the part. The spinning collet closes around the part to retain it during cut-off. Once the part is cut off, the head unit retracts and the back-machining tool arm swings into position. As the head unit advances towards the arm back-machining is completed. Once again the head unit retracts from the tool arm. As the tool arm swings away the part received arm swings into place to receive the part as the collet is opened. Actuation of the various components of the system is controlled through electronically controlled pneumatic cylinders prompted by the PC's pre-programmed EEPROM. The instantaneous response and movement of the unit through this electronic and pneumatic control, in contrast to the cam actuation of the prior attachments, provides the increased revolutions available for extended back-machining. In addition to these machining operations the assembly can be programmed for accelerated machining by incorporating a cutting tool in the head unit collet. Thus, the present invention provides extended back-machining and efficient part recovery integrated into the host machine's predetermined cycle time. Simply, the pneumatic/electronic control of the present invention provides more machining revolutions within the predetermined cycle time of the host machine in order to conduct more thorough back-machining of the part. Whereas previous known attachments were restricted to approximately 30 machining revolutions the pneumatic/electronic control of the present invention provides up to 80 revolutions to complete back-machining within the host machine's cycle time. Accordingly, the attachment assembly of the present invention operates within the cycle time of the host machine to complete the necessary back-machining.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 2 is a plan view of the attachment assembly interfaced with a multi-spindle machining unit;

FIG. 3 is a partial cross-sectional view of the attachment assembly showing the head unit in the extended and retracted positions;

FIG. 4 is a cross-sectional view of the head unit of the attachment assembly;

FIG. 5 is a view along lines 5—5 of FIG. 2;

FIG. 6 is a view along lines 6—6 of FIG. 2;

FIG. 8A through 8E are examples of the machining operations completed by a multi-spindle machine.

DETAILED DESCRIPTION OF A PREFERRED EMBODIMENT OF THE PRESENT INVENTION

Figure 1:
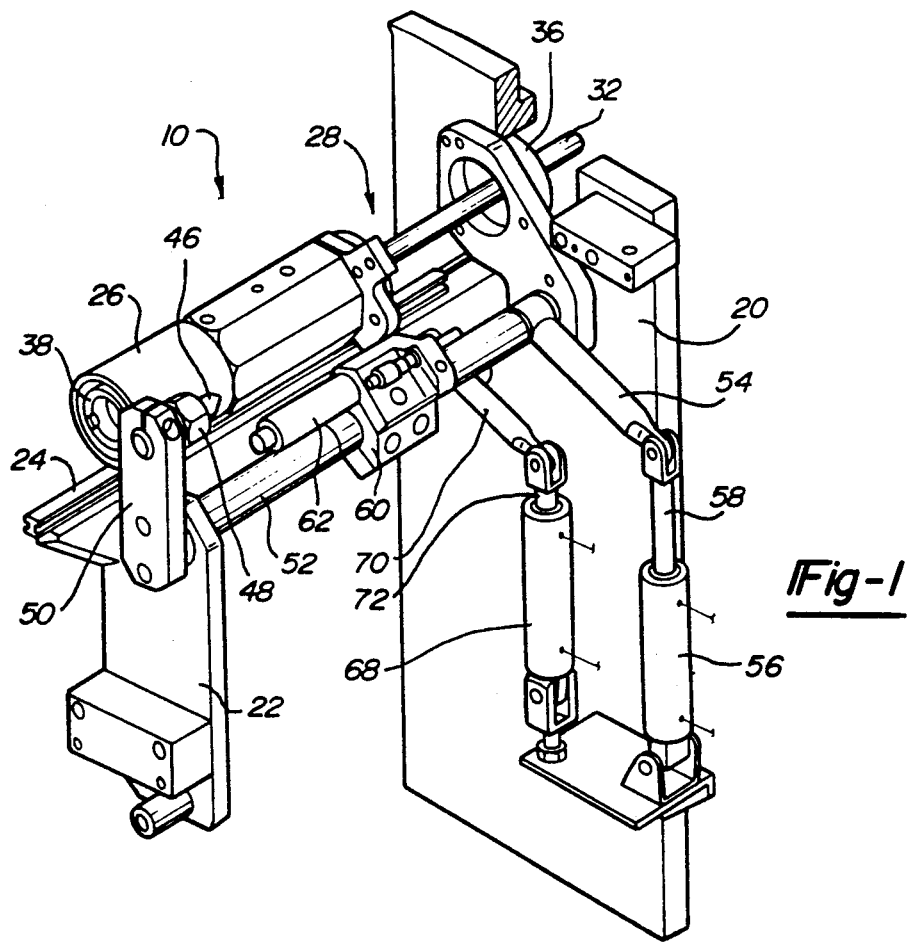
FIG. 1 is an elevated perspective view of the attachment assembly embodying the present invention.

Referring first to FIGS. 1 and 2, there is shown an attachment assembly 10 for a machining apparatus such as a multi-spindle screw machine 12 used to machine component parts 14 from bar stock 16. The multi-spindle screw machine 12 may employ any number of spindles 18 and corresponding machining stations although the present invention will be described in conjunction with a six spindle screw machine 12 for clearness of understanding. Multi-spindle machines conduct numerous machining operations on the bar stock 16 to form a component part by passing the part through the various stations where the specific machining tool, i.e. drill, mill, tap, etc., is deployed to machine the part. The bar stock 16 is typically rotated through each of the stations until the completed part is cut-off from the bar stock. In many instances the stock is rotated at high speeds to complete the machining operation. The cut-off part must be held securely as it is cut-off and retrieved for storage of the parts. Additionally, back-machining of the component part may be necessary. Currently, only limited back-machining can be accomplished on the multi-spindle machine due to limited available revolutions in the cycle within which to complete back-machining. The present invention provides positive part retrieval during cut-off and significantly extended back-machining within the existing cycle time of the host multi-spindle machine 12 to which the attachment 10 is interfaced. The attachment assembly 10 of the present invention accomplishes the pick-off, back-machining and retrieval operations using electronically controlled pneumatics working totally independent from the host machine's cam actuation system. The micro-PC controlled pneumatic cylinders of the present invention operate much faster and have proven more reliable than the cam actuated assemblies of the prior known attachment assemblies.

The attachment assembly 10 is preferably mounted in close proximity to the machining apparatus 12 to retrieve the cut-off part 14. The assembly 10 is stabilized through a rear attachment wall 20 to which the remote end of the assembly 10 is mounted and a front mounting bracket 22 which is attached directly to the host machine 12. Secured to the wall 20 and bracket 22 is a rail 24 to which a head unit 26 of a pickup attachment 28 is slidably mounted. In a preferred embodiment, the head unit 26 is mounted to a pair of double-sealed linear bearings 30 which ride along the rail 24 for precision longitudinal movement and stability during back machining. Thus, the head unit 26 of the pick-off attachment 28 longitudinally extends and retracts along the rail 24 to perform the pick-off and back-machining operations as will be subsequently described.

Referring now to FIGS. 1 through 4, the pick-off attachment 28 includes a rotor shaft 32 through which the internal assembly of the head unit 26 is rotated and which facilitates extension and retraction of the head unit 26. The shaft 32 extends through the wall 20 and is supported by rear bearings 34, an intermediate housing 36 through which rotation is controlled, and extends into the head unit 26. The head unit 26 incorporates a rotatable axial assembly connected to the shaft 32 and including a pneumatically operated collet 38 for engaging and retrieving the part 14. The collet 38 is replaceable within the head unit 26 to accommodate different part sizes and is positioned at the front end of the head unit 26. Pneumatic actuation of the collet 38 allows for fluctuations in cut-off part diameters which would damage conventional cam-operated collets or its associated actuation linkage. Additionally, because of the pneumatic control, collet tension can be set in order to prevent damage to delicate or thin wall parts. The preferred collet 38 includes a self-contained ejector 40 to eject the part 14 once the machining operations are complete so that the head unit 26 may retrieve the next component part 14 from the host machine 12. The axial assembly including the collet 38 are rotatably supported by bearings 42 such that the collet 38 may rotate in unison with the part 14 while it is still in the machining apparatus 12 and during back-machining operations. In order to maintain lubrication of the internal assembly of the head unit 26 a lubrication path 44 is formed therein. The rotational motion of the axial assembly creates a pumping action to deliver the lubricant through the path 44 thereby providing a self-lubricating head unit 26.

While the pick-off attachment 28 controls the longitudinal movement of the part 14, one or more back machining tools may be sequentially swung into alignment with the part 14. For clearness of understanding the present invention will be described in conjunction with a single back-machining tool with the understanding that additional tools may be incorporated for more sophisticated back-machining operations. A back-machining tool 46, such as a drill bit, is removably clamped within a chuck 48 attached to a swing arm 50 used to selectively position the tool 46 in the path of the part 14. The swing arm 50 is attached to a pivot shaft 52 supported by the bracket 22. The opposite end of the pivot shaft 52 is connected to a pivot arm 54 actuated by a first pneumatic cylinder 56. The first cylinder 56 includes a piston shaft 58 which is connected to the pivot arm 54 for manipulation thereof. Upon extension of the piston shaft 58, arm 54 will be pivoted causing rotation of pivot shaft 52 and corresponding pivoting of the swing arm 50 to move the tool 48 into the path of the head unit 26. Similarly, retraction of piston shaft 58 within the cylinder 56 will swing the arm 50 away from the pick-up attachment 28. In order to limit the travel of the head unit 26 with respect to the tool 46, the head unit 26 is connected to a mounting block 60 which preferably holds at least one micrometer 62 corresponding to the tools 46 employed in the back-machining operations. As the head unit 26 travels forward to engage the part 14 against the tool 46 the micrometer 62 will engage the mounting bracket 22 signalling that the back-machining depth is sufficient and the head unit 26 should be retracted. In a preferred embodiment the micrometer block 60 is mounted to and travels along the pivot shaft 52. Although the present invention has been described with a single back-machining tool 46, it should be understood that a plurality of tools may be incorporated into the attachment assembly 10. Each additional tool will be independently controlled through a separate cylinder, pivot shaft, and micrometer to swing the tool into position according the timing parameters of the operation. Additional tools may include deburring tools, mills, taps, etc. in order to complete back-machining of the part 14 prior to disposal thereof.

Part recovery of the prior known systems has proven completely unreliable. The rotation of the part during cut-off and variances in stock diameter result in significant lost parts. In addition to the pneumatically operated collet 38 which can accommodate variances in part size, the present invention incorporates a positive part recovery system for receiving the part 14 upon ejection from the collet 38. Once machining operations are complete, the head unit 26 will again retract to allow the tools 46 to swing out of position and to allow deployment of the part recovery system. In the preferred embodiment and as best shown in FIG. 2, part recovery is conducted through a part receiver tube 64 which is selectively swingable into alignment with the head unit 26 in order to receive the part 14 to a storage bin or conveyor. The tube 64 is connected to a secondary pivot shaft 66 which in turn is connected to a second pneumatic cylinder 68 through a pivot arm 70. As with the tool arm 50, the receiver tube 64 will be swung into position to receive the part 14 upon extension of the cylinder shaft 72 which will cause the pivot shaft 66 to rotate accordingly. Retraction of the piston shaft 72 will move the tube 64 out of alignment with the head unit 26. The receiver tube 64 is designed to closely align with the part 14 such that the part 14 will be ejected directly into the tube 64.

Figure 7:
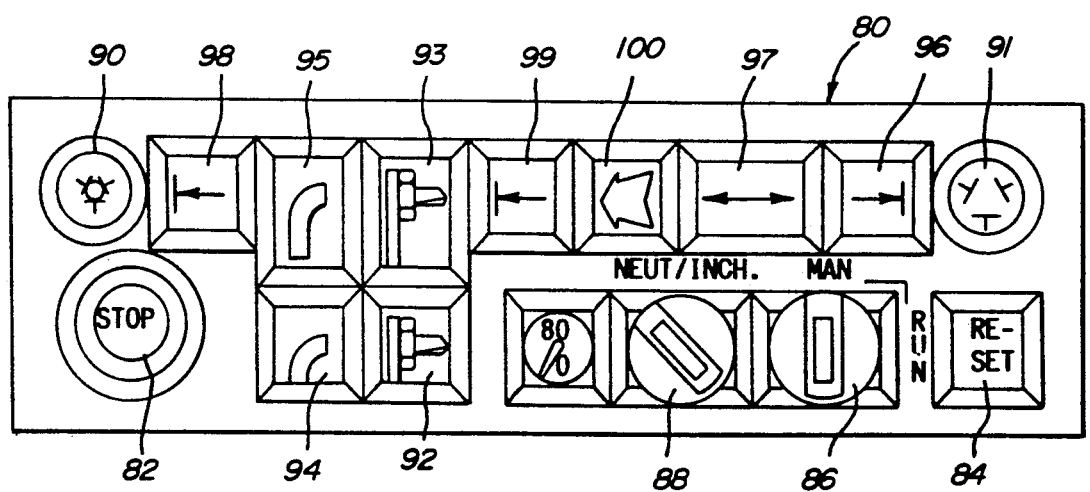
FIG. 7 is a schematic view of the control panel for the attachment assembly of the present invention.

Control of the operation of the attachment assembly 10 is conducted by and through a programmable control system which allows the user to tailor production of each part rather than being limited by the available cams of the prior known systems. Preferably, the control system incorporates a microcomputer interfaced with the host machines controls as well as the pneumatic actuators of the attachment assembly 10. Such a control system provides more reliable operation and simple trouble-shooting. The control system incorporates an indicator/control panel 80 as shown in FIG. 7 to provide a positive visual indication as each step occurs as well as manual operation for step-through trouble shooting. In the preferred embodiment the control system is programmed such that if any parameter needed for proper operation is not met, the head unit 26 "goes home" and shuts down with the indicator lights providing the operator an indication of the problem area. Accordingly, the operator can step-through each of the operations to determine the exact nature of the problem. In addition to the normal stop 82, reset 84, manual/automatic 86 and inch 88 switches, the control panel 80 incorporates a plurality of indicator lights/switches to control the individual operations of the attachment assembly 10. Each of the lights/switches will be described as indicator lights although it should be understood that such lights also act as switches to engage the specific operation. A collet closed light 90 and collet open light 91 provide an indication of the collet position. Retraction and extension of the back-machining tool is indicated through lights 92 and 93, respectively. Similarly, retraction and extension of the part recover tube is indicated by lights 94 and 95, respectively. The position and/or movement of the head unit is indicated by arrow lights. The "home" or fully retracted position is indicated by light 96. Movement of the head unit 26 is shown by light 97. Full extension to pickup the next part is indicated by light 98 whereupon the collet may close. Partial extension upon completion of machining or during ejection of the part is indicated by light 99. Ejection of the part is indicated by light 100. Thus, in the event of trouble, such as incomplete extension of the head unit 26 to pickup a part, the appropriate light, i.e. indicator 98, will remain lit to provide the operator with a visual indication of the trouble area.

Figure 9:
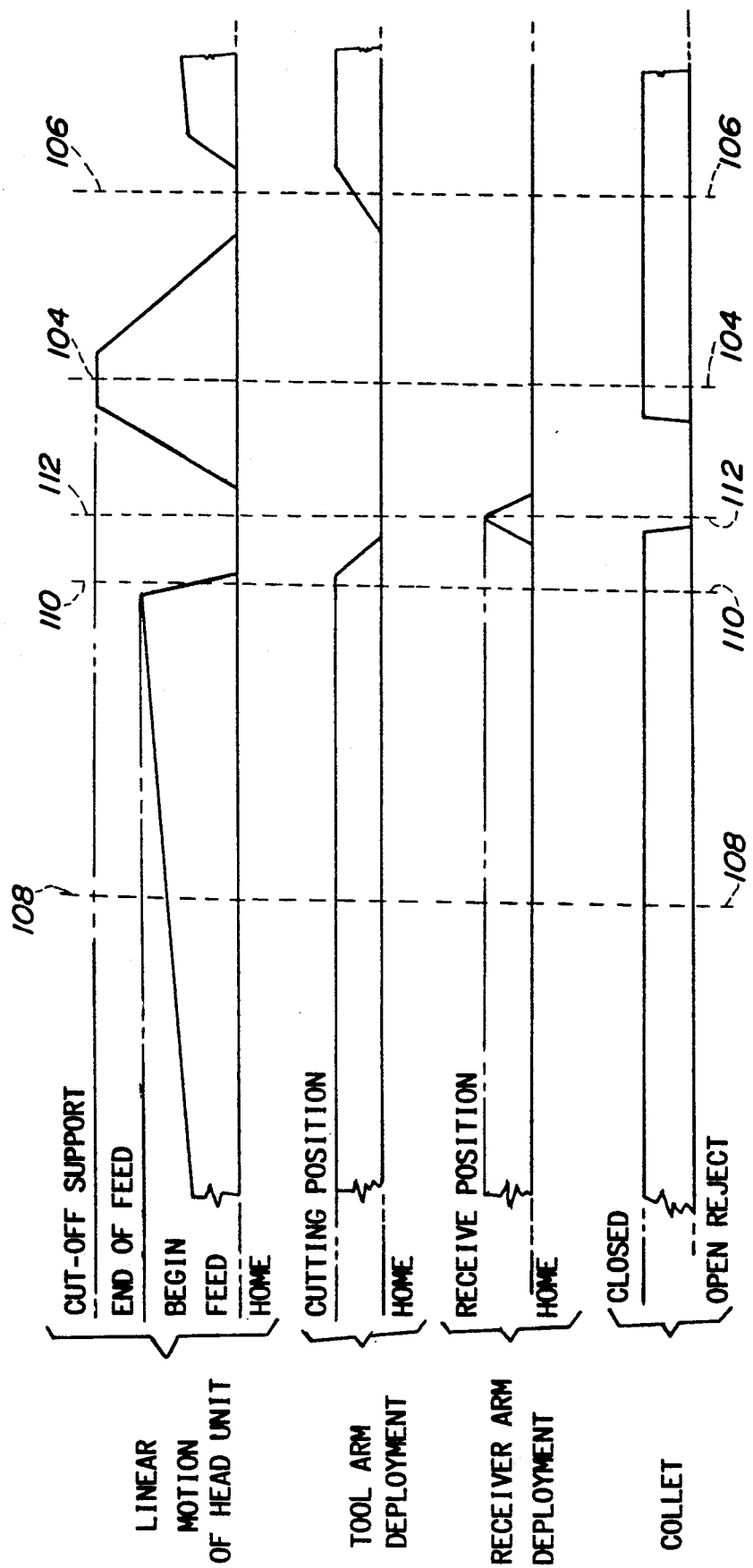
FIG. 9 is a timing table showing the cooperative timing of the operation of the attachment assembly of the present invention.

Because any back-machining operations and part recovery must be completed within the predetermined cycle time of the host machine, timing becomes critical. The timing graph of FIG. 9 provides an example of the timing considerations involved with the present invention. The timing graph represents the operation of the attachment assembly 10 through one cycle of the host machine which is dependent upon the slowest individual operation of the multi-spindle host machine. Typical operations of a multi-spindle machine are shown in FIGS. 8A-8C with cut-off of the part 14 occurring at the last station (FIG. 8C). A first station of the multi-spindle machine may drill a first hole in the end of the part 14 (FIG. 8A) which extends from the bar stock 16. Additional holes may be drilled or tapped or side milling conducted (FIG. 8B) to form the desired part configuration. To separate the completed part 14 from the bar stock 16, the part 14 will be cut-off using an appropriate cutting tool 102. At this point, the collet 38 has engaged the part 14 for support during cut-off. However, because the part 14 only needs support at the very end of the cutting operation time during which the head unit will sit idle is minimized. The pneumatic/electronic control of movement of the collet, head unit, etc. provides an increased period of time - which translates into an increase in revolutions - over which to complete the back-machining operations. Smaller periods of time within the predetermined cycle time are used to position the part for back-machining. As a result, a greater period of time is available for the additional machining operations. The attachment assembly 10 of the present invention is a self-contained unit which performs the part retrieval and back-machining functions with the cycle time of the host machine 12. The combination of computer control and pneumatic actuation provides extended back-machining capacity within the existing cycle times of the host machine. The attachment 10 mates with the host machine only to provide adequate cut-off support and retrieval -- all other functions are independent of the host machine 12 as the assembly 10 operates as an extension of the host multi-spindle machine 12. The timing graph of FIG. 9 represents one complete cycle of the host machine 12 and the interaction of the various components of the attachment assembly 10. The timing graph illustrates the relative movements of the components from their home positions to their fully extended positions and how these movements interrelate. By way of example, the timing graph of FIG. 9 illustrates that as the head unit 26 moves forward and back-machining operation is being conducted yet upon completion of back-machining by the tool arm 46 the head 26 is retracted to its home position to allow deployment of the receiver arm 64. The pneumatic and computer controls of the present invention facilitate the nearly instantaneous movements of the components as depicted in the timing graph.

In order to illustrate the increased periods for back-machining within the cycle time of the host machine, reference is now made to the timing graph of FIG. 9 and beginning with the head unit 26 fully extended for cut-off support at cycle time 104. In this position, the collet 38 will be closed and both the tool arm and receiver tube will be swung outwardly. Upon cut-off of the part 14 the head unit 26 will fully retract allowing the tool arm 50 to swing into position at cycle time designated as 106. With the tool 46 in alignment with the part 14 the head unit 26 will slowly move forward to complete the back-machining operation over the cycle time period generally surrounding designation 108 of the timing graph until back-machining is completed at cycle time 110. 108. Upon completion of back-machining at cycle time 110, the head unit 26 will again retract allowing the tool arm 50 to move away from the head unit 26. The receiver tube 64 can now be swung into position during the cycle time designated as 112 at which point the collet 38 opens and the part 14 is ejected into the tube 64. The cycle is again initiated once the receiver tube 64 is swung out of position allowing the head unit 26 to extend into engagement with the next part 14 for cut-off support. Thus, the entire operation is conducted within the cycle time of the host machine in order to retrieve the parts 14 as they are cut-off from the bar stock 16. Operation is completely controlled by the programmable control system interfaced with the host machine and providing actuation through electronically controlled pneumatic cylinders for reliable and efficient operation. The pneumatic/electronic control provides quicker positioning of the various components of the present invention thereby "freeing" more cycle time for the back-machining operation. During the back-machining operation generally designated at time 108 on the timing graph, that is the period between the time the tool arm 50 swings into position at time 106 and when the machining operation is completed at time 110 of the cycle, the attachment assembly of the present invention will have provided 87.5 machining revolutions as compared to approximately 30 revolutions available for back-machining in the prior known attachment assemblies. Accordingly, the present invention facilitates more efficient machining of the part all within the cycle constraints of the host machine.

The foregoing detailed description has been given for clearness of understanding only and no unnecessary limitations should be understood therefrom as some modification will be obvious to those skilled in the art without departing from the scope and spirit of the appended claims.

What is claimed is:

1. An attachment assembly for a machining apparatus adapted to machine a component part within a predetermined cycle time of the machining apparatus, said attachment assembly comprising:

a pick-up attachment having a collet mounted therein for retrieving the machined component part from the machining apparatus, said pick-up attachment longitudinally movable to engage the component part in the machining apparatus, the component part being received by said collet mounted within said pick-up attachment for removal from the machining apparatus:

means for completing at least one back-machining operation on the component part positioned in said pick-up attachment; and means for dispensing the component part from said pick-up attachment into a part recover system;

said retrieval of the component part, back-machining, and dispensing being completed within the predetermined cycle time of the machine apparatus whereby said pick-up attachment is in position to retrieve a new component part at the beginning of the predetermined machining cycle.

2. The attachment assembly as defined in claim 1 wherein said collet rotates within said pick-up attachment in conjunction with the component part during final machining in the machining apparatus thereby supporting the component part.

3. The attachment assembly as defined in claim 2 wherein said means for completing at least one back machining operation includes a back-machining tool selectively actuable into axial position relative to said pick-up attachment, said pick-up attachment movable to engage the component part with said back-machining tool.

4. The attachment assembly as defined in claim 3 wherein said means for dispensing the component from said pick-up attachment into a part recover system includes a receiving attachment comprising a receiver tube selectively positionable relative to said pick-up attachment, said collet releasing the component part into said receiver tube upon longitudinal movement of said pick-up attachment proximate said receiving attachment.

5. The attachment assembly as defined in claim 4 wherein actuation of said pick-up attachment, said back-machining means and said dispensing means is conducted through electronically controlled pneumatic cylinders such that an increased proportion of cycle time is made available for completing at least one back-machining operation on the component part.

6. The attachment assembly as defined in claim 5 and further comprising indicator/control means, said indicator/control means providing visual indication of the automatic operation of said attachment assembly and incremental manual control of said attachment assembly.

7. The attachment assembly as defined in claim 2 wherein said pick-up attachment is longitudinally slidable on a linear bearing rail for retrieval, additional machining and dispensing of the component parts.

8. The attachment assembly as defined in claim 4 wherein said pick-up attachment includes a central ejector pin for dispensing the component part from said collet into said part recover system, said ejector pin selectively extending into said collet to eject the component part from said collet.

9. The attachment assembly as defined in claim 7 wherein said collet is pneumatically actuated thereby accommodating component parts of different diameters.

10. The attachment assembly as defined in claim 6 and further comprising a reprogrammable automatic control system interfaced with the control system of the machining apparatus.

11. An attachment assembly for a multi-spindle machining apparatus adapted to machine a component part, the multi-spindle machining apparatus having a plurality of stations for completing individual machining operations within a predetermined cycle time, said attachment assembly comprising:

a longitudinally movable pick-up attachment for retrieving the machine component part from the final station of the machining apparatus, said pick-up attachment longitudinally movable axially relative to the machining apparatus along a rail and including a collet for engaging the component part.

at least one back-machining tool for completing additional machining operations on the component part, said at least one back-machining tool movable into axial alignment with said pick-up attachment such that longitudinal displacement of said pick-up attachment in a first direction will cause the component part to engage said at least one back-machining tool for back-machining of the retrieved component part positioned in said collet of said pick-up attachment;

means for dispensing the component part from said pick-up attachment into a part recover system, said means including a receiver tube movable into axial alignment with said pick-up attachment such that longitudinal displacement of said pick-up attachment in said first direction and release of the component part by said collet will cause the component part to travel into said receiver tube; and automatic control means interfaced with a control system of the machining apparatus, said control means governing retrieval of the component part, back-machining of the component part and dispensing of the component within the cycle time of the machining apparatus whereby said pick-up attachment is in a start position to retrieve a next component part at the beginning of the machining cycle.

12. The attachment assembly as defined in claim 11 wherein said pick-up attachment is slidably movable on a linear bearing rail.

13. The attachment assembly as defined in claim 12 wherein said pick-up attachment slidable between a retracted position, a first extended position for retrieval of the component part, a second extended position for back-machining, and a third extended position for dispensing of the component part.

14. The attachment assembly as defined in claim 13 wherein actuation of said pick-up attachment, said at least one back-machining tool, and said dispensing means is conducted through electronically controlled pneumatic cylinders.

15. The attachment assembly as defined in claim 14 wherein said automatic control means includes an indicator/control panel providing visual indication of the automatic operation of said attachment assembly and incremental manual control of said attachment assembly.

16. An attachment assembly for a multi-spindle machining apparatus adapted to machine a component part, the multi-spindle machining apparatus having a plurality of stations for completing individual machining operations within a predetermined cycle time, said attachment assembly comprising:

a longitudinally slidable pick-up attachment for retrieving the machine component part from the final station of the machining apparatus, said pick-up attachment having a collet assembly in one end thereof for engaging the component part;

at least one back-machining tool selectively movable into axial alignment with said pick-up attachment;

means for dispensing the component part from said pick-up attachment into a part recovery system, said means including a receiver tube selectively deployable into axial alignment with said pick-up attachment; and automatic control means interfaced with a control system of the machining apparatus for governing the operations of said attachment assembly within the cycle time of the machining apparatus wherein actuation of said pick-up attachment, said at least one back-machining tool and said receiver tube is conducted through electronically controlled pneumatic cylinders operated by said automatic control means;

said pick-up attachment movable between a fully retracted position, a first extended position for engagement of the component part by said collet assembly during the final machining operation, a second extended position to engage the component part against said at least one back-machining tool moved into axial alignment with said pick-up attachment, and a third extended position for dispensing the component part into said receiver tube moved into axial alignment with said pick-up attachment.

17. The attachment assembly as defined in claim 6 wherein said pick-up attachment includes a head unit having said collet rotatably mounted therein for rotation of the component part.

18. The attachment assembly as defined in claim 16 wherein said control means includes an indicator/control display providing visual indication of the automatic operation of said attachment assembly and incremental manual control of said attachment assembly.

* * * * *